United States Patent [19] [11] Patent Number: 4,668,238
Wicki [45] Date of Patent: May 26, 1987

[54] THE DYEING OF LEATHER WITH MIXTURES OF TRISAZO AND TETRAKISAZO COMPOUNDS HAVING 1-AMINO-8-HYDROXYNAPHTHALENE-MONO- OR DI-SULFONIC ACID BISCOUPLING COMPONENT RADICALS

[75] Inventor: Heinz Wicki, Basel, Switzerland

[73] Assignee: Sandoz Ltd., Basel, Switzerland

[21] Appl. No.: 784,862

[22] Filed: Oct. 4, 1985

[30] Foreign Application Priority Data

Oct. 18, 1984 [DE] Fed. Rep. of Germany ....... 3438108

[51] Int. Cl.⁴ ...................... C09B 67/22; C09B 33/22; D06P 1/06; D06P 3/32
[52] U.S. Cl. ......................... 8/437; 8/641; 8/681; 8/687
[58] Field of Search ............... 8/437, 641, 687

[56] References Cited

U.S. PATENT DOCUMENTS 3,927,963 12/1975 Papa et al. ...................... 8/641
4,468,348 8/1984 Wicki ................................ 534/614

Primary Examiner—A. Lionel Clingman
Attorney, Agent, or Firm—Gerald D. Sharkin; Richard E. Vila; Melvyn M. Kassenoff

[57] ABSTRACT

A process of dyeing a leather substrate comprising applying to the leather substrate a mixture of at least one compound of the formula

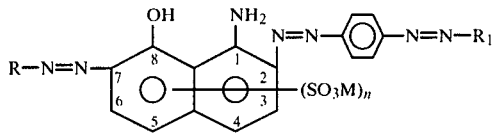

and at least one compound of the formula

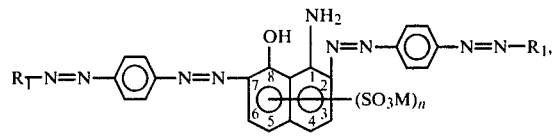

wherein each R is independently

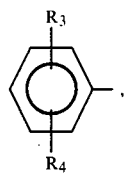

wherein:
  $R_3$ is hydrogen, $-SO_3M$ or $-COOM$, and
  $R_4$ is hydrogen, $C_{1-4}$alkyl or $C_{1-4}$alkoxy,
each $R_1$ is independently a coupling component radical, and
each n is independently 1 or 2, wherein each M is independently hydrogen or a cation.

19 Claims, No Drawings

ORGANIC COMPOUNDS

The invention relates to novel mixtures of trisazo and tetrakisazo dyestuffs useful for dyeing substrates, in particular leather.

Aqueous dyeing of grain leather, in particular of chrome-tanned grain leather, in dark (especially black) tones produces problems of insufficient covering of grain side of the leather and undesired side effects such as bronzing.

Dyeings made with trisazo compounds of formula I below have the disadvantage that they tend to give an insufficient covering on the grain size of the leather and to build-up primarily on one side of the leather only. Dyeings made with tetrakisazo compounds of formula II below on the other hand have the disadvantage that bronzing on the grain side occurs, especially with deep shades.

These disadvantages can, surprisingly, be alleviated by a process, according to the invention, of dyeing a substrate comprising applying to the substrate a mixture of at least one compound of formula I

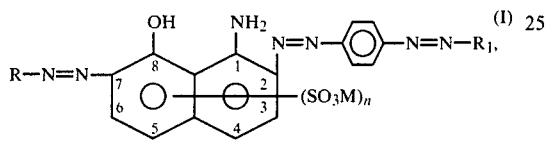

and at least one compound of formula II

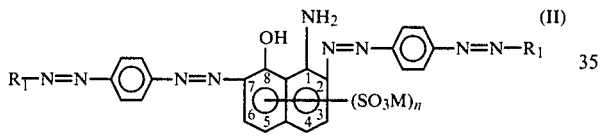

in which R is a group of formula (a)

where $R_3$ is hydrogen, —$SO_3M$ or —COOM and $R_4$ is hydrogen, $C_{1-4}$-alkyl or $C_{1-4}$alkoxy;
$R_1$ is a coupling component radical;
n is 1 or 2; and
M is hydrogen or a cation.

In compounds of formula II, both $R_1$s are preferably the same.

Preferably in compounds of formula II, n and the position of the sulpho groups are identical to those in the corresponding compounds of formula I. Preferably M when a cation is a non-chromophoric cation.

Preferably the substrate is leather, more preferably chrome-tanned leather.

Preferably a process according to the invention is carried out at a temperature in the range 20° to 80° C., more preferably 40° to 70° C. Preferably the pH is in the range 9 to 2.5, particularly 5 to 2.5 for chrome-tanned leather.

Further, according to the invention there is provided mixtures of at least one compound of formula I defined above and at least one compound of formula II defined above.

In this Specification any $C_{1-4}$alkyl group is preferably methyl or ethyl, more preferably methyl. Any $C_{1-4}$alkoxy group is preferably ethoxy or methoxy, more preferably methoxy. In this Specification where a significance appears more than once in the same or a different formula, the significances are independent of one another unless indicated to the contrary.

Preferably the molar ratio of the one or more compounds of formula I to the one or more compounds of formula II is 9:1 to 1:9, more preferably 4:1 to 1:3, most preferably 3:1 to 0.5:1 and especially 3:1 to 0.7:1.

Preferably n is 2.

Preferably $R_1$ is a coupling component radical of the benzene series or the naphthalene series.

Preferably when two sulpho groups are present on a compound of formula I or II, they are in the 3- and 6-positions of the naphthalene ring.

Preferably $R_3$ is hydrogen.

Preferably $R_4$ is hydrogen.

Preferably R is unsubstituted phenyl.

Preferably, when $R_1$ is a radical of the naphthalene series, $R_1$ is a group of formula (b)

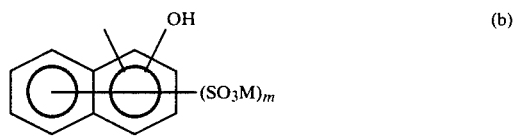

where m is 0, 1 or 2.

Preferably when $R_1$ is a radical of the benzene series, $R_1$ is a phenyl group bearing two meta positioned (to each other) hydroxy or amino groups and a hydroxy and an amino group; the phenyl group optionally bearing one or two further substituents $C_{1-4}$alkyl, chloro, —$SO_3M$ or —$NO_2$—. Included in the term "amino" are —$NH_2$; —$NHR_5$; —$N(R_{5a})_2$ where $R_5$ is selected from $C_{1-4}$alkyl, carboxymethyl, $C_{1-2}$alkylcarbonyl, phenyl or tolyl and $R_{5a}$ is $C_{1-4}$alkyl.

More preferably when $R_1$ is a radical of the benzene series, $R_1$ is a group of formula (c) or (d)

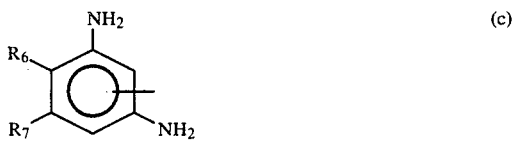

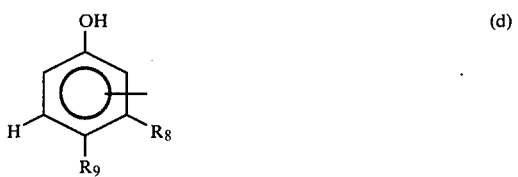

in which $R_6$ is hydrogen, methyl, chloro, nitro or —$SO_3M$;
$R_7$ is hydrogen or, when $R_6$ is not —$NO_2$ or $SO_3M$ also $SO_3M$;
$R_8$ is —$NH_2$; —$N(CH_3)_2$; —$N(C_2H_5)_2$; —$NHC_2H_5$;

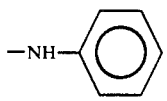

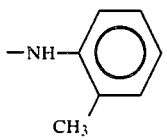

or —NH—CO—CH$_3$; and

R$_9$ is hydrogen or methyl.

M is preferably hydrogen or an alkali metal cation such as lithium, sodium or potassium.

Preferably R$_6$ is hydrogen.

Preferably R$_7$ is hydrogen.

Preferably R$_8$ is R$_8'$ where R$_8'$ is tolylamino, acetylamino and —NH$_2$, more preferably —NH$_2$.

Preferably R$_1$ is R$_1'$ where R$_1'$ is a group of formula (b), (c) or (d) defined above.

Preferred mixtures according to the invention are those in which R$_1$ is R$_1''$ where R$_1''$ is a mixture of groups of formula (c) and (d), preferably on average in the ratio of 9:1 to 1:9, more preferably in the ratio of 3:1 to 1:3.

Preferred mixtures according to the invention are those having at least two compounds of formula I and at least two compounds of formula II present.

Mixtures according to the invention can be prepared by diazotising a mixture of at least a compound of formula III

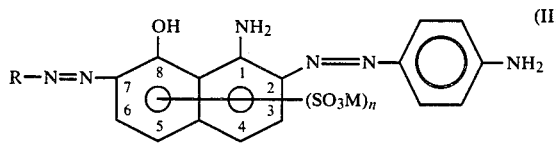

in which the symbols R, M and n are as defined above and at least a compound of formula IV

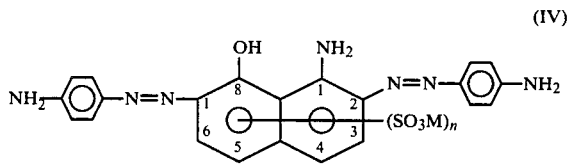

and then coupling the diazotised mixture with a coupling component of formula V

  (V)

where R$_1$ is as defined above.

The mixtures of compounds of formulae III and IV can be prepared by reducing the corresponding nitro compounds by known methods.

The corresponding nitro compounds can be prepared by reacting a compound of formula VI

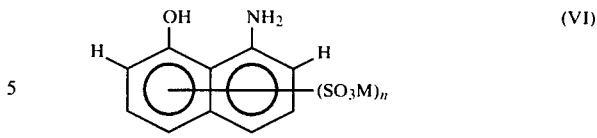

with excess of the diazotized compound of the amine of formula VII

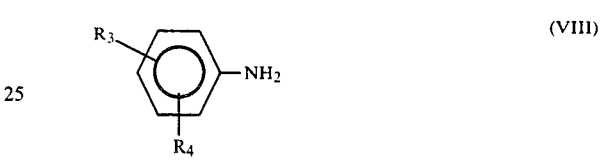

initially in an acid pH range followed by bringing the pH to a less acid to alkaline range and reacting the product with the diazo derivative of a compound of formula VIII $$\underset{R_4}{\underset{|}{\overset{R_3}{\overset{|}{\bigcirc}}}}-NH_2 \quad (VIII)$$

whereby for each mole of compound of formula VI 2 moles in total of the diazotised amines of formulae VII and VIII are used.

Diazotisation and coupling can be carried out by known methods. The compounds of formulae VI, VII and VIII are known or can be prepared by known methods from appropriate reactants.

The pH range for the reaction of compound of formula VI and the diazotized compound of formula VII is preferably 0-2 for coupling in the 2-position. For coupling in the 7-position the pH is preferably 2 to 14, more preferably 2-3. For coupling to the diazo compound of formula VIII in the 7-position, the pH is preferably 5-10. The pH for the coupling reaction of mixtures of diazotised compounds of formulae III and IV with the compound of formula V is preferably 5-10.

The mixtures according to the invention have good water solubility and are useful for dyeing substrates that are usually dyed with anionic dyestuffs, in particular for leather. The leather is preferably tanned, more preferably chrome-tanned. The preferred type of leather is grain leather, particularly chrome-tanned grain leather.

The dye mixtures can be impregnated or exhausted onto the substrate using any conventional anionic dyestuffs dyeing method. One preferred method is exhaustion from an aqueous bath.

The dyeings produced from mixtures according to the invention have good depth of color and good levelness and other fastness properties are good. In particular, the supple feel of the leather is not affected by a mixture of the invention and at very deep dyeings no unwanted bronzing effect occurs.

The invention will be illustrated by the following Examples in which all temperatures are in °C. and all parts are by weight.

EXAMPLE 1

309 Parts of 1-amino-8-hydroxy-3,6-disulphonaphthalene (H acid) are stirred into 1000 parts of water and the pH is brought 6 to 7 by the addition of sodium hydroxide solution. The H acid dissolves fully.

138 Parts of 1-amino-4-nitrobenzene are stirred in 300 parts of water, the slurry is then reacted with 70 parts of sodium nitrite and the mixture is added dropwise to a well stirred preparation of 500 parts of ice and 250 parts of 30% HCl solution. The H acid solution is added dropwise to the diazotised 1-amino-4-nitrobenzene solution whilst stirring well. The temperature of the reaction mass is 0° and the pH is 1.5. After stirring for 3 hours no 1-amino-4-nitrobenzene diazo compound can be detected.

In a similar fashion, 69 parts of 1-amino-4-nitrobenzene is diazotised. The pH of the reaction mass is brought to 2.3 by the addition of sodium hydroxide solution and then the diazotised 1-amino-4-nitrobenzene is added so that at this pH coupling occurs. 48 parts of aniline is dissolved in 100 parts of water and 60 parts of 30% HCl solution is diazotised at 0° by the addition of 70 parts of sodium nitrite solution.

The aniline diazo solution is added to the reaction mass and by the dropwise addition of 250 parts of a 30% NaOH solution the pH is brought to 9.5. As soon as no further diazo compound can be detected the reaction solution is reduced with 180 parts of sodium sulphide dissolved in 180 parts of water. The resulting mono- and disazo compound mixture is salted out with NaCl and then filtered. The filtered mixture is then redissolved, reacted with ice, acidified with HCl and then diazotised by the dropwise addition of 100 parts of sodium nitrite.

Into the resulting suspension, 162 parts of 1-hydroxy-3-aminobenzene, dissolved in 300 parts of water are added dropwise and the pH is raised to 9 by the addition of NaOH solution. After 3 hours, no 1-hydroxy-3-aminobenzene is detectable. The dyestuff precipitates out by the addition of NaCl and is filtered. A black powder results that dyes paper and in particular leather, deep black tones. The product is a 1:1 mixture of compounds of formulae 1a and 1b

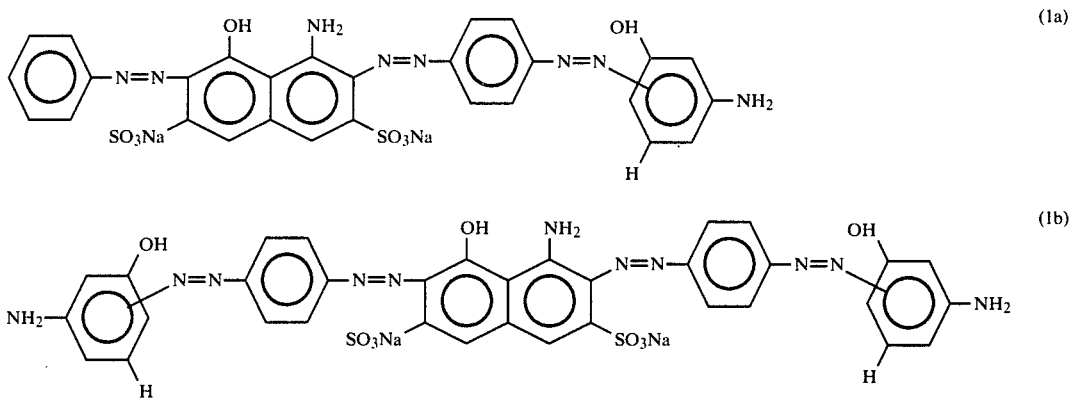

The dyestuff mixture shows excellent covering ability on grain leather and has good light fastness properties. The dyeings on leather of low affinity cover it well.

EXAMPLES 2 TO 35

Mixtures of dyes of the formulae

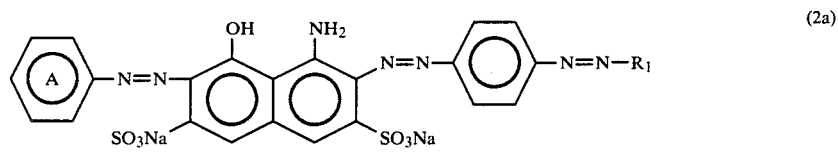

and

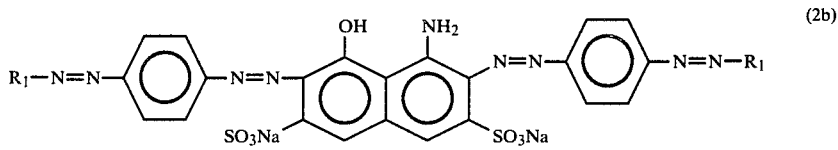

in which $R_1$-H is defined in the Table below may be formed analogously to the method of Example 1 from appropriate starting materials.

TABLE

| EX. No. | $R_1$—H | molar ratio of 2a to 2b | Shade on leather |
|---|---|---|---|
| 2 | meta-phenylenediamine | 1:1 | black |
| 3 | " | 2:1 | " |
| 4 | 2,4-diaminobenzene-1-sulphonic acid | 1:1 | " |
| 5 | " | 2:1 | " |
| 6 | 1-chloro-2,4-diaminobenzene | 1:1 | " |
| 7 | " | 2:1 | " |
| 8 | 2,4-diaminotoluene | 1:1 | " |
| 9 | " | 2:1 | " |

TABLE-continued

| EX. No. | R₁—H | molar ratio of 2a to 2b | Shade on leather |
|---|---|---|---|
| 10 | 2-chloro-3,5-diaminobenzene-1-sulphonic acid | 1:1 | " |
| 11 | " | 2:1 | " |
| 12 | 1-nitro-2,4-diaminobenzene | 1:1 | " |
| 13 | " | 2:1 | " |
| 14 | meta-aminophenol | 2:1 | " |
| 15 | " | 3:1 | " |
| 16 | meta-dimethylaminophenol | 1:1 | " |
| 17 | " | 2:1 | " |
| 18 | meta-diethylaminophenol | 1:1 | " |
| 19 | " | 2:1 | " |
| 20 | 3-ethylamino-4-methylphenol | 1:1 | " |
| 21 | " | 2:1 | " |
| 22 | meta-phenylaminophenol | 1:1 | blue-black |
| 23 | " | 2:1 | " |
| 24 | meta-(2'-methylphenyl)-aminophenol | 1:1 | " |
| 25 | " | 2:1 | " |
| 26 | meta-acetylamino-phenol | 1:1 | " |
| 27 | " | 2:1 | " |
| 28 | α-naphthol | 1:1 | " |
| 29 | " | 2:1 | " |
| 30 | 2-hydroxynaphthalene-3,6-disulphonic acid | 1:1 | " |
| 31 | " | 2:1 | " |
| 32 | β-naphthol | 1:1 | " |
| 33 | " | 2:1 | " |
| 34 | 2-hydroxynaphthalene-5-sulphonic acid | 1:1 | " |
| 35 | " | 2:1 | " |

In Examples 2 to 35, the phenyl group A can be replaced by ortho-, meta- or para-phenylsulphonic acid or para-carboxyphenyl. Carboxy and/or sulpho groups may be in sodium salt form.

APPLICATION EXAMPLE A

100 Parts of freshly tanned and neutralised chrome grain leather (cow hide) were flexed in a bath of 250 parts water and 1 part of the dyestuff mixture of Example 1 for 30 minutes at 55°, after which the leather was treated with 2 parts of an anionic fat liquor based on sulphonated train oil in the same bath for a further 30 minutes and the leather was dried and treated according to standard procedures. A very level dyed leather having deep black nuances and optimum fastness properties was obtained.

At the beginning of the dyeing process the pH is 4.5 and at the end of the dyeing process the pH is 3, the pH being regulated by the addition of formic acid.

Instead of the dyestuff mixture of Example 1 an appropriate amount of any mixture of Examples 2 to 35 may be used.

APPLICATION EXAMPLE B

Instead of using the mixture of Example 1 in Application Example 1, a mixture of 0.5 parts of the dyestuff mixture of Example A, and 0.5 parts of the dyestuff mixture of Example 2 can be used. A deep black dyeing is obtained.

In analogous fashion any other combination of mixtures selected from those of Examples 1 to 35 may be used instead of the combination of the mixtures of Example 1 and Example 2 in Application Example B.

What is claimed is:

1. A process for dyeing a leather substrate comprising applying to a leather substrate a mixture comprising
  (i) at least one compound of the formula

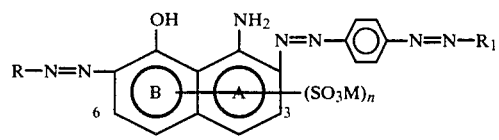

(ii) at least one compound of the formula

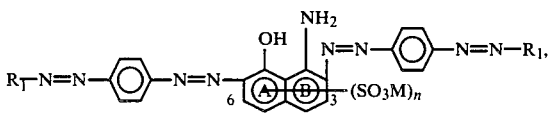

wherein each R is independently

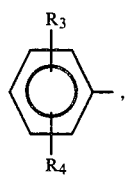

wherein
  $R_3$ is hydrogen, —SO₃M or —COOM, and
  $R_4$ is hydrogen, $C_{1-4}$alkyl or $C_{1-4}$alkoxy,
  each $R_1$ is independently a coupling component radical, and
  each n is independently 1 or 2, wherein each M is independently hydrogen or a cation.

2. A process according to claim 1 wherein each M is independently hydrogen or a non-chromophoric cation.

3. A process according to claim 2 wherein each $R_1$ is independently a coupling component radical of the benzene or naphthalene series.

4. A process according to claim 3 wherein each $R_1$ is independently

13. A process according to claim 12 wherein the mixture comprises (i) at least one compound of the formula

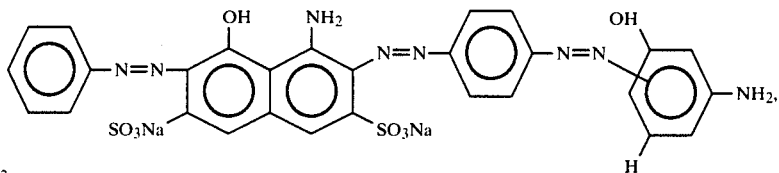

(ii) at least one compound of the formula

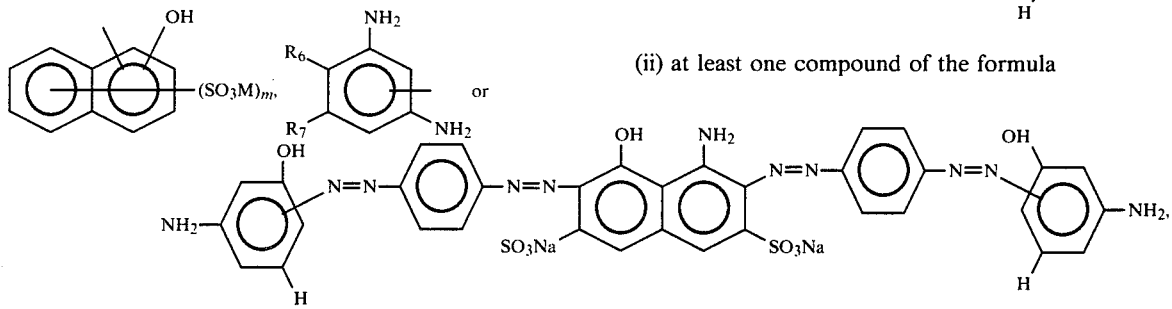

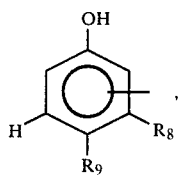

wherein
- R$_6$ is hydrogen, methyl, chloro, nitro or —SO$_3$M,
- R$_7$ is hydrogen or —SO$_3$M, with the proviso that R$_7$ must be hydrogen when R$_6$ is nitro or —SO$_3$M,
- R$_8$ is amino, ethylamino, dimethylamino, diethylamino, phenylamino, 2-methylphenylamino or acetamido,
- R$_9$ is hydrogen or methyl, and m is 0, 1 or 2.

5. A process according to claim 4 wherein the molar ratio of (i) to (ii) is 9:1 to 1:9.

6. A process according to claim 5 wherein the temperature is 20°–80° C. and the pH is 2.5–9.

7. A process according to claim 6 wherein the temperature is 40°–70° C.

8. A process according to claim 7 wherein the pH is 2.5–5.

9. A process according to claim 8 wherein the leather substrate is chrome-tanned leather.

10. A process according to claim 6 wherein the molar ratio of (i) to (ii) is 4:1 to 1:3.

11. A process according to claim 10 wherein each M is independently hydrogen, lithium, sodium or potassium.

12. A process according to claim 6 wherein
- each R$_3$ is hydrogen,
- each R$_4$ is hydrogen,
- each R$_6$ is hydrogen,
- each R$_7$ is hydrogen,
- each R$_8$ is independently amino, 2-methylphenylamino or acetamido,
- each n is 2, and the sulfo groups on Rings A and B are in the 3- and 6-positions thereof.

wherein the ratio of (i) to (ii) is about 1:1.

14. A process according to claim 1 wherein each R$_1$ is independently a coupling component radical of the benzene or naphthalene series.

15. A process according to claim 14 wherein each R$_1$ is independently

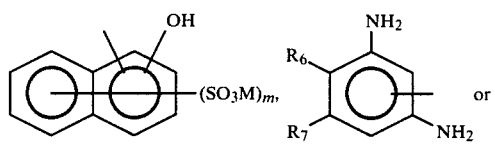

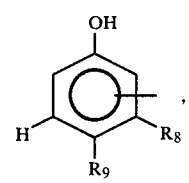

wherein
- R$_6$ is hydrogen, methyl, chloro, nitro or —SO$_3$M,
- R$_7$ is hydrogen or —SO$_3$M, with the proviso that R$_7$ must be hydrogen when R$_6$ is nitro or —SO$_3$M,
- R$_8$ is amino, ethylamino, dimethylamino, diethylamino, phenylamino, 2-methylphenylamino or acetamido,
- R$_9$ is hydrogen or methyl, and
- m is 0, 1 or 2.

16. A process according to claim 1 wherein the leather substrate is chrome-tanned leather.

17. A process according to claim 1 wherein the temperature is from 20° to 80° C., inclusive.

18. A process according to claim 1 wherein the pH is from 9 to 5, inclusive.

19. A leather substrate to which a mixture comprising (i) at least one compound of the formula

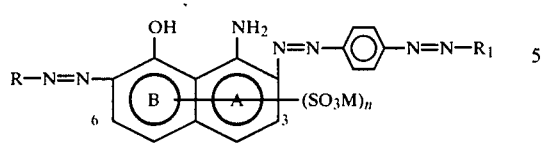
(ii) at least one compound of the formula
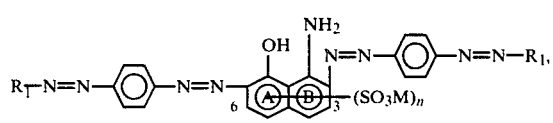
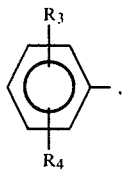
wherein each R is independently
wherein:
R$_3$ is hydrogen, —SO$_3$M or —COOM, and
R$_4$ is hydrogen, C$_{1-4}$alkyl or C$_{1-4}$alkoxy,
each R$_1$ is independently a coupling component radical, and
each n is independently 1 or 2,
wherein each M is independently hydrogen or a cation, has been applied.
* * * * *